United States Patent

Anderson

Patent Number: 5,678,865
Date of Patent: Oct. 21, 1997

[54] TANK TEE UNIT

[75] Inventor: Stephen J. Anderson, Storm Lake, Iowa

[73] Assignee: Merrill Manufacturing Company, Inc., Storm Lake, Iowa

[21] Appl. No.: 547,770

[22] Filed: Oct. 25, 1995

[51] Int. Cl.⁶ ............................................. F16L 41/04
[52] U.S. Cl. ................... 285/150; 285/423; 285/915; 29/890.148; 403/346; 403/265; 156/294; 156/304.3
[58] Field of Search ........................ 29/890.148, 428; 285/150, 151, 152, 153, 154, 423, 915, 192, 155, 156; 138/155, 141; 150/293, 294, 304.3, 305.5; 403/70, 265, 205, 395, 346

[56] References Cited

U.S. PATENT DOCUMENTS

| | | | |
|---|---|---|---|
| 2,460,622 | 2/1949 | Crawley | 29/890.148 |
| 2,548,788 | 4/1951 | Helme | 285/150 X |
| 2,674,785 | 4/1954 | Crawley | 29/157 |
| 3,219,366 | 11/1965 | Franck | 285/150 X |
| 3,497,245 | 2/1970 | Metzger | 285/150 |
| 3,510,156 | 5/1970 | Markowz | 285/150 X |
| 3,654,008 | 4/1972 | Rogers et al. | 285/156 |
| 3,873,391 | 3/1975 | Plauka et al. | 285/156 |
| 3,957,292 | 5/1976 | Diggs | 285/150 |
| 4,465,307 | 8/1984 | de Lange | 285/156 |
| 4,708,374 | 11/1987 | Cox | 285/158 |
| 5,181,747 | 1/1993 | Jovero | 285/156 |

*Primary Examiner*—Terry Lee Melius
*Assistant Examiner*—Heather Shackelford
*Attorney, Agent, or Firm*—Henderson & Sturm

[57] ABSTRACT

A tank tee unit is formed from a plurality of standard pvc pipes secured together only by a suitable glue. It includes a main pipe of heavy wall pvc sandwiched between and glued to two heavy wall pvc pipes extending perpendicularly therefrom which are in turn each glued to a standard smaller diameter pvc pipe that passes entirely through the main pipe to form an extremely strong joint. This provides a unit in the form of a cross with outlets on opposite sides of the main pipe and with thick wall branch lines that can be tapped for other side connections. One side outlet can be plugged to provide a strictly tee unit.

20 Claims, 2 Drawing Sheets

TANK TEE UNIT

BACKGROUND OF THE INVENTION

This invention relates to improvements in plastic tank tee units and a method of fabricating the same for use in water distribution systems.

Plastic is increasingly being used to replace metal in a variety of products and endeavors to fabricate a plastic tee fitting or coupling is exemplified in U.S. Pat. Nos. 3,654,008, 3,873,391, 4,465,307, 4,708,374 and 5,181,747. In the water distribution field to which this invention is directed, tee fittings are commonly subjected to very rough service and handling so that it is essential in fabricating a plastic pipe fitting that the joints between the several parts are strong enough to withstand the rough conditions that they encounter. The above patents disclose the use of a variety of procedures and parts which include external coatings, madrel forming, custom sleeved and extra threading of mating parts that in their various constructions still have certain disadvantages in the strength of the joints and economies of manufacture that are necessary for the use intended by this invention.

With these observations in mind, it is one of the important objects of this invention to provide a plastic tank tee unit in which a strong joint, equal in strength to metal, is formed between parts so that the unit can serve as an alternative to metal pipe fittings in water distribution systems and, for all practical purposes, be pollution free.

Another object herein is to provide an economical and effective method of assemblying a plurality of standard pvc pipes into a strong integral unit by connecting the several parts solely with a suitable glue.

A further object is to provide a method of assemblying a tank tee unit as characterized that produces a cross configuration with outlets at respective opposite sides of the main pipe and with one of such outlets closeable by a plug to provide only a tee fitting.

Still another object is to provide a tank tee unit of the above class that includes branch lines with extra thick walls that can be tapped for other side connections.

SUMMARY

A tank tee unit is formed from a plurality of standard pvc pipes secured together only by a suitable glue. It includes a main flow pipe of standard heavy wall pvc pipe provided with internally threaded outlets on each end and is transversely drilled intermediate its ends at midpoint to receive a smaller diameter standard pvc pipe that extends entirely through it and beyond on opposite sides. The smaller diameter pipe is also transversely drilled at midpoint to provide an opening for registration with the longitudinal bore of the main pipe. On opposite sides of the main pipe a respective heavy thick wall standard pvc pipe is glued to the main pipe and to the smaller pipe to provide an extremely strong joint. This provides a unit in the form of a cross with extra thick wall branch outlets that can be tapped for other side connections and with one of the side outlets closeable by a plug to provide a strictly tee unit.

The foregoing objects and such further objects as may appear herein, or be hereinafter pointed out, together with the advantages of this invention will be more fully discussed and developed in the more detailed description of the accompanying drawings.

Figure 1:
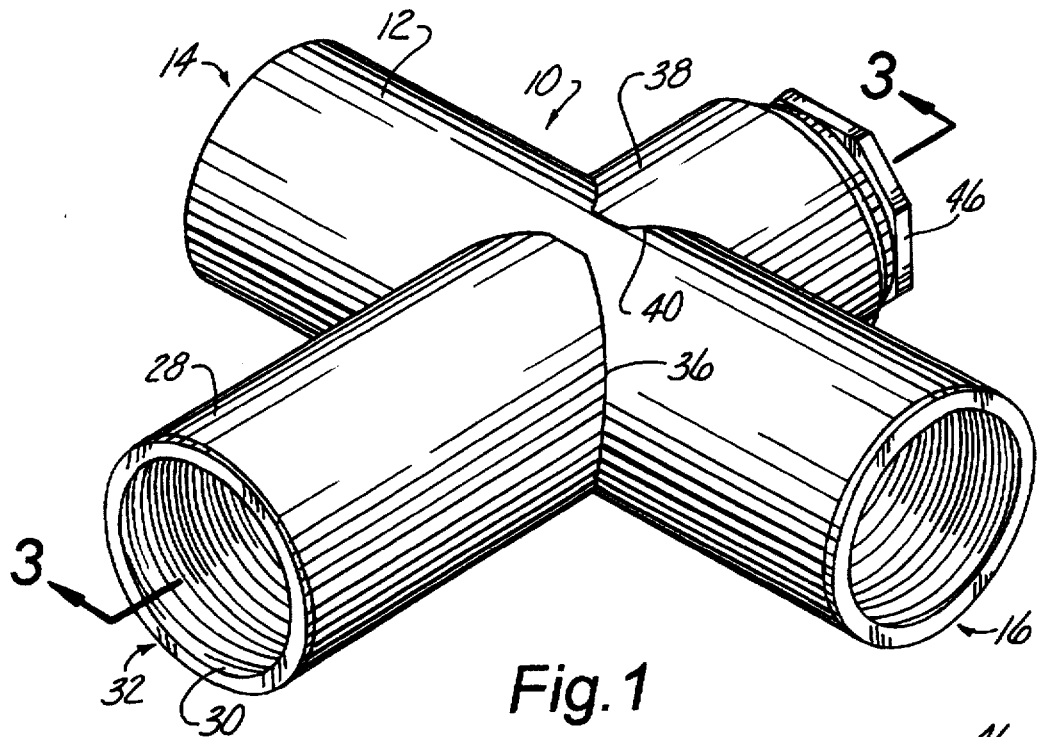
FIG. 1 is a perspective view of a tank tee unit constructed according to my invention.
Figure 2:
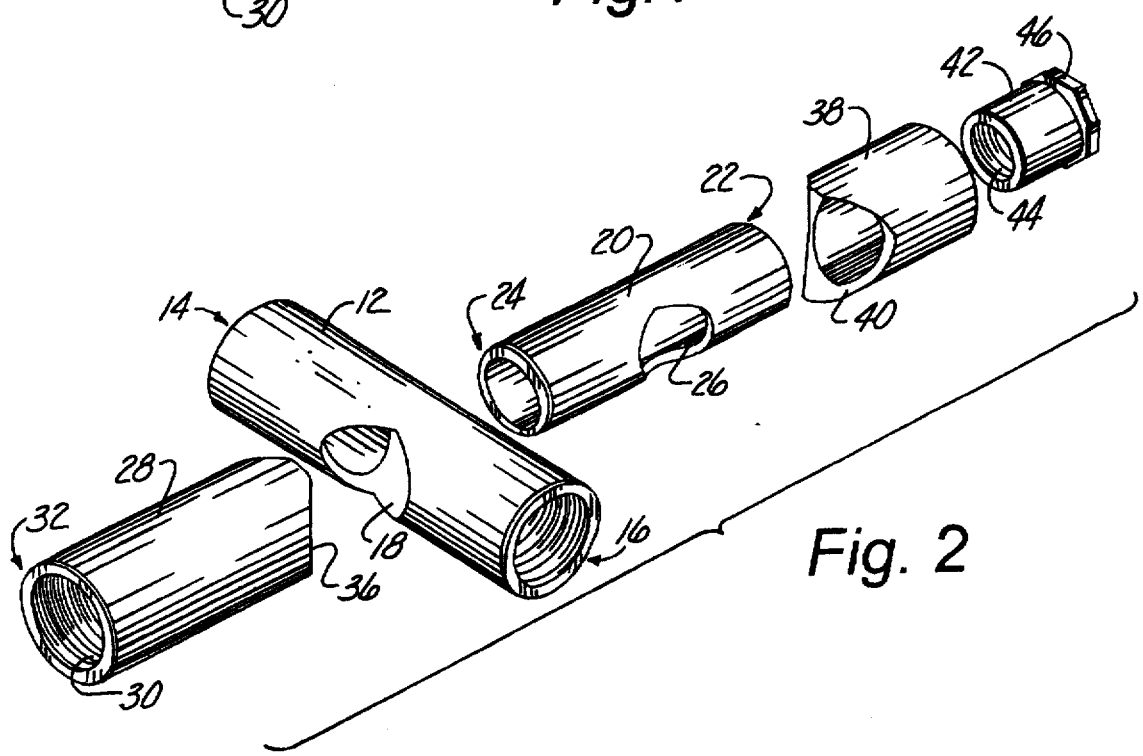
FIG. 2 is a reduced exploded perspective view showing the several component parts of the device in FIG. 1.

Referring to the drawings, this tank tee unit is designated generally by the numeral 10 and with reference more particularly to FIG. 2, the several parts are described as follows. The main flow conduit 12 is a plastic coupling made of standard heavy wall pvc pipe that is internally threaded at respective opposite ends, 14, 16 and is drilled transversely of its longitudinal axis at midpoint intermediate ends 14, 16 to provide a through opening 18. The size of opening 18 is such, as will later appear, that it will accommodate a standard pvc pipe 20 of lesser length and diameter than pipe 12, and which is also drilled transversely of its longitudinal axis at midpoint intermediate ends 22, 24 to provide the through opening 26.

Figure 3:
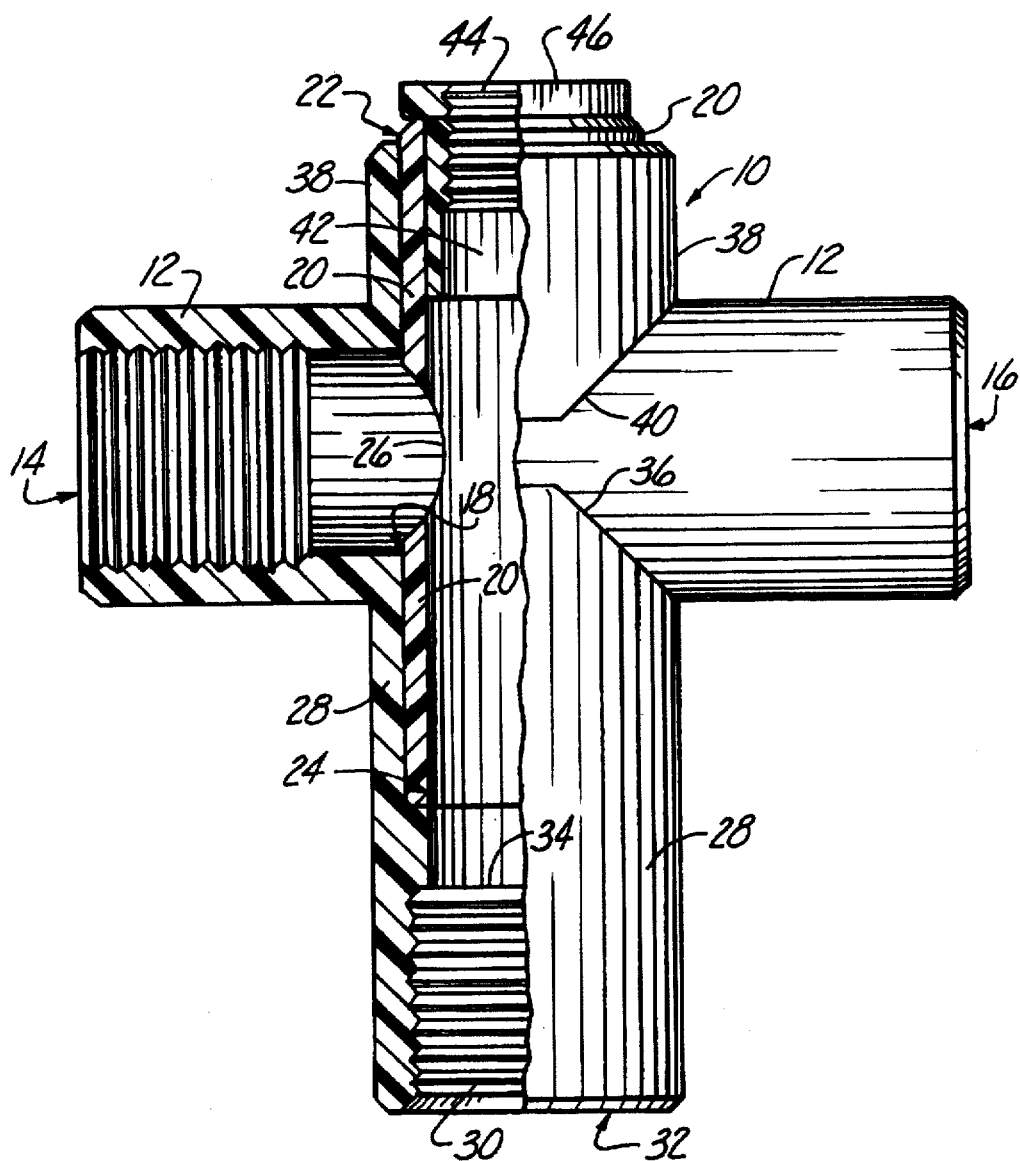
FIG. 3 is a cross sectional view taken on the line 3—3 of FIG. 1.
Figure 4:
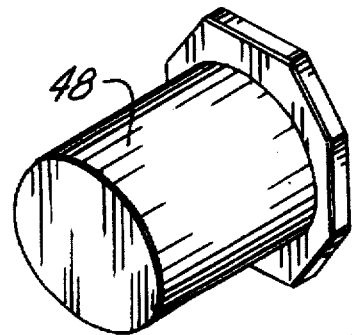
FIG. 4 is a perspective view of an alternative fitting for the fitting shown at the far right end of FIG. 2.

Another compoment of tee unit 10 is the plastic coupling 28, also of standard heavy wall pvc pipe that is internally threaded 30 at one end 32 and is provided with the internal circumscribing lip 34 (FIG. 3) just above the threads 30. The other end 36 of coupling 28 is contoured to fit the outside diameter contour of pipe 12 and this done by starting with a longer length of pipe for coupling 28 than shown and machining such longer length at right angle to simultaneously produce another short pipe 38 with a corresponding contoured edge 40 matching edge 36 to also fit the outside diameter of pipe 12. Pipe 38 is reamed inside to receive end 22 of pipe 20. While pipes 28 and 38 can be formed from separate pieces with separate machining required, forming them simultaneously from a single piece of pipe length is preferred for economy and efficiency in fabrication.

Fitting 42 is a short internally threaded 44 pipe with a nut-like hexagonal peripheral edge 46 adapted for attachment to another pipe (not shown) and, as will appear, is replaceable at times with a plug 48.

METHOD OF ASSEMBLY

End 24 of pipe 20 is journalled into the contoured end 36 of pipe 28 with opening 26 transverse to the longitudinal axis of pipe 20 and is glued to pipe 28. Preferably, I provide the lip 34 (FIG. 3) within pipe 28 which serves as a stop to limit the penetration of end 24 of pipe 20 therein and thus positions opening 26 as will appear.

With end 24 of pipe 20 glued to pipe 28, end 22 is passed through and outwardly from opening 18 in pipe 12 until the contoured end 36 of pipe 28 abuts the outside diameter of pipe 12 and is glued thereto. In this position, opening 26 is in registration with the internal bore of pipe 12 for flow communication as is apparent. Pipe 38 is journalled over end 22 of pipe 20 to place its contoured end 40 in abutting engagement with the outside diameter of pipe 12 at a point on the opposite side of pipe 12 to edge 36 of pipe 28 and in this position, is glued to both pipe 20 and to pipe 12. By this arrangement, the main pipe 12 of heavy wall pvc is sandwiched between the two heavy wall pvc pipes 28 and 38 glued thereto and which are each glued to the standard smaller diameter pipe 20 that passes entirely through pipe 12 to form an extremely strong joint of the parts equal in strength to metal so it can serve as an alternative to metal pipe fittings in water distribution systems and, for all practical purposes, is pollution free for environmental concerns. Also, because of the use of heavy thick wall pvc pipes 28, 38 for branch lines, such lines can be tapped for other side connections that is an advantage over tee units for similar purposes.

Tee unit 10 when assembled as described, actually produces a cross with an outlet on both sides of the main pipe 12 represented by end 32 of pipe 28 and fitting 42 when glued into end 22 of pipe 20. Tee unit 10, however, can also be used only as a tee fitting by replacing fitting 42 with plug 48 to enhance its versatility. Accordingly, in view of the foregoing, it is thought a full understanding of the construction and assemblying of this invention will be had and the advantages of the same will be appreciated.

I claim:

1. A method of fabricating a tank tee unit comprising the steps of:

providing first, second, third and fourth sections, forming a transverse through opening in said first section, disposing said second section through said opening so it projects from said first section in two opposite directions therefrom, and securing solely by a suitable glue said third and fourth sections respectively to said second section at respective projecting opposite sides of said second section.

2. A method according to claim 1, including:

selecting a pipe size for said second section of lesser diameter than that of said first section, sizing the opening in said first section to fit the outer diameter of said second section, and forming a transverse through opening in said second section disposed to register with the longitudinal interior of said first section.

3. A method according to claim 1 wherein all of said sections are selected from pipe of standard manufacture that is commercially available.

4. A method according to claim 1 wherein said third and fourth sections are selected from standard heavy thick wall pipe capable of being tapped for side connections.

5. A method of fabricating a tank tee unit comprising the steps of:

providing first, second, third and fourth sections, forming a transverse through opening in said first section, disposing said second section through said opening so it projects from said first section in two opposite directions therefrom, securing said third and fourth sections respectively to said second section at respective projecting opposite sides of said second section and to respective opposite sides of said first section, and providing a closure plug for one end of said second section and gluing the closure therein.

6. A method according to claim 5, including:

selecting a pipe size for said second section of lesser diameter than that of said first section, sizing the opening in said first section to fit the outer diameter of said second section, and forming a transverse through opening in said second section disposed to register with the longitudinal interior of said first section.

7. A method of fabricating a tank tee unit comprising the steps of:

providing first, second, third and fourth sections, forming a transverse through opening in said first section, disposing said second section through said opening so it projects from said first section in two opposite directions therefrom, securing said third and fourth sections respectively to said second section at respective projecting opposite sides of said second section and to respective opposite sides of said first section, and providing an internally threaded fitting glued into one end of said second section.

8. A method according to claim 7, including:

selecting a pipe size for said second section of lesser diameter than that of said first section, sizing the opening in said first section to fit the outer diameter of said second section, and forming a transverse through opening in said second section disposed to register with the longitudinal interior of said first section.

9. A method of fabricating a tank tee unit comprising the steps of:

providing first, second, third and fourth sections, forming a transverse through opening in said first section, disposing said second section through said opening so it projects from said first section in two opposite directions therefrom, securing said third and fourth sections respectively to said second section at respective projecting opposite sides of said second section and to respective opposite sides of said first section, and providing one respective end of said third and fourth sections with a contour to fit the outside diameter of said first section for engagement therewith.

10. A method according to claim 9, including:

selecting initially for said third section a pipe of greater length than ultimately needed, and machining said greater length at right angle to create said fourth section whereby each of said third and fourth sections are simultaneously provided with corresponding contoured ends to fit the outer diameter of said first section at respective opposite sides thereof.

11. A method according to claim 9 including gluing said third and fourth sections respectively to said second section at respective opposite sides of said first section and to respective opposite sides of said first section.

12. A method according to claim 9, including:

selecting a pipe size for said second section of lesser diameter than that of said first section, sizing the opening in said first section to fit the outer diameter of said second section, and forming a transverse through opening in said second section disposed to register with the longitudinal interior of said first section.

13. A tank tee unit composed of pipe sections, comprising:

a first pipe provided with a transverse through opening intermediate its ends, a second pipe disposed through said opening so as to project outwardly from said first pipe at opposite sides of said opening, a third pipe secured to said second pipe and to said first pipe at one side of said opening, and a fourth pipe secured to said second pipe and to said first pipe at the opposite side of said opening, wherein said third and fourth pipes are secured to said first and second pipes solely by a suitable glue.

14. A tank tee unit as defined in claim 13, including:

said second pipe being of lesser diameter than that of said first pipe, said opening in said first pipe being sized to approximate the outer diameter of said second pipe, and said second pipe provided with a through transverse opening in registration with the longitudinal interior of said first pipe.

15. A tank tee unit composed of pipe sections, comprising:

a first pipe provided with a transverse through opening intermediate its ends, a second pipe disposed through said opening so as to project outwardly from said first pipe at opposite sides of said opening, a third pipe secured to said second pipe and to said first pipe at one side of said opening, a contoured edge on one end of said third pipe to abut the outer diameter of said first pipe at one side of said opening, a fourth pipe secured to said second pipe and to said first pipe at the opposite side of said opening, and a contoured edge on one side of said fourth pipe to abut the outer diameter of said first pipe at the opposite side of said opening.

16. A tank tee unit as defined in claim 15, including:

said second pipe being of lesser diameter than that of said first pipe, said opening in said first pipe being sized to approximate the outer diameter of said second pipe, and said second pipe provided with a through transverse opening in registration with the longitudinal interior of said first pipe.

17. A tank tee unit composed of pipe sections, comprising:

a first pipe provided with a transverse through opening intermediate its ends, a second pipe disposed through said opening so as to project outwardly from said first pipe at opposite sides of said opening, a third pipe secured to said second pipe and to said first pipe at one side of said opening, a fourth pipe secured to said second pipe and to said first pipe at the opposite side of said opening, and an internally threaded fitting glued into one end of said second pipe.

18. A tank tee unit as defined in claim 17, including:

said second pipe being of lesser diameter than that of said first pipe, said opening in said first pipe being sized to approximate the outer diameter of said second pipe, and said second pipe provided with a through transverse opening in registration with the longitudinal interior of said first pipe.

19. A tank tee unit composed of pipe sections, comprising:

a first pipe provided with a transverse through opening intermediate its ends, a second pipe disposed through said opening so as to project outwardly from said first pipe at opposite sides of said opening, a third pipe secured to said second pipe and to said first pipe at one side of said opening, a fourth pipe secured to said second pipe and to said first pipe at the opposite side of said opening, and a closure plug glued into one end of said second pipe.

20. A tank tee unit as defined in claim 19, including:

said second pipe being of lesser diameter than that of said first pipe, said opening in said first pipe being sized to approximate the outer diameter of said second pipe, and said second pipe provided with a through transverse opening in registration with the longitudinal interior of said first pipe.

* * * * *